United States Patent [19]

Uphaus

[11] Patent Number: 5,687,990
[45] Date of Patent: Nov. 18, 1997

[54] CLAMPING MEANS FOR AN ADJUSTABLE STEERING COLUMN IN MOTOR VEHICLES

[75] Inventor: Ludger Uphaus, Neuenkirchen, Germany

[73] Assignee: Lemförder Metallwaren AG, Lemförde, Germany

[21] Appl. No.: 603,540

[22] Filed: Feb. 20, 1996

[30] Foreign Application Priority Data

Feb. 23, 1995 [DE] Germany ................. 195 06 210.8

[51] Int. Cl.$^6$ ................................................. B62D 1/18
[52] U.S. Cl. .................................... 280/775; 74/493
[58] Field of Search ............................... 280/775, 777, 280/779; 74/492, 493

[56] References Cited

U.S. PATENT DOCUMENTS 4,648,624 3/1987 Mouhot et al. ..................... 74/493
4,657,281 4/1987 Haldric et al. ...................... 280/775

FOREIGN PATENT DOCUMENTS 345101   12/1989  European Pat. Off. ......... 74/493
39 20 783 C1  8/1990  Germany.
40 34 710 A1  5/1992  Germany.
41 18 863 C1  9/1992  Germany.
2009929  3/1994  U.S.S.R. ........................ 74/493

Primary Examiner—Paul N. Dickson
Attorney, Agent, or Firm—McGlew and Tuttle

[57] ABSTRACT

The present invention pertains to a clamping device for an adjustable steering column in motor vehicles, in which a tubular housing adjustable in the direction of its longitudinal axis can be clamped between two holders rigidly connected to the vehicle body by a clamping mechanism with a clamping bolt, which passes through the two holders at right angles to the longitudinal axis of the tubular housing and can be actuated by a handle. A locking member is additionally provided, which is supported by an abutment fixed axially at the clamping bolt, on the one hand, and has a sword edge directed obliquely downward toward a component rigidly connected to the tubular housing, forming an angle with the longitudinal axis of the clamping bolt, on the other hand.

13 Claims, 1 Drawing Sheet

CLAMPING MEANS FOR AN ADJUSTABLE STEERING COLUMN IN MOTOR VEHICLES

FIELD OF THE INVENTION

The present invention pertains to a clamping means for an adjustable steering column in motor vehicles in which a tubular housing, which is adjustable in the direction of its longitudinal axis, can be clamped between two holders which are rigidly connected to the vehicle body by a clamping mechanism with a clamping bolt which passes through the two holders at right angles to the longitudinal axis of the tubular housing and which can be actuated by a handle.

BACKGROUND OF THE INVENTION

These generic features have been known from DE 39 20 783-C1. The clamping bolt is of a three-part design in this case and comprises a threaded sleeve and two threaded pins with one left-handed threaded section and one right-handed threaded section, so that clamping forces, by which the holders of a limitedly elastic design having friction surfaces can be pressed against friction surfaces on the tubular housing, are applied by rotating the threaded sleeve. In the clamping device according to DE 41 18 863, the clamping is performed by clamping pins, which are arranged outside one of the two holders between a bolt shoulder and a handle rotatably supported on the clamping bolt, so that the handle transmits axial force components during the clamping. A similar design for applying the clamping forces to the clamping bolt has been known from EP-B1-0 242 928, in which axial forces are transmitted to the holders by a needle bearing. Compared with locking means with positive-locking engagement, such frictionally engaged clamping means offer the advantage that the adjustment of the steering column can take place essentially without noise, but above all continuously. The adjustment takes place in the area of slots which are arranged in a mutually crossing arrangement in the holders, which are rigidly connected to the vehicle body, as well as in components which are rigidly connected to the tubular housing. A continuous square hole, in which the clamping bolt provided with the clamping mechanism is arranged, is obtained due to the crosswise overlap of the slots.

A clamping device in which the clamping element is arranged pivotably around an axis extending at right angles to but at a spaced location from the longitudinal axis of the jacket tube has been known from DE 40 34 710 A1. Axial forces acting on the jacket tube exert a torque on the clamping element and thus cause it to tilt on the jacket tube. The clamping effect on the jacket tube is reinforced up to a deformation by the oblique position of the clamping element.

The clamping forces of this system are sufficient for normal driving operation, but stronger clamping forces are required for vehicles equipped with air bags in order for the steering column to remain in the steering wheel position set upon the impact of the driver against the air bag. On the other hand, an enlargement of the clamping surface leads to a loss of comfort.

SUMMARY AND OBJECTS OF THE INVENTION

Thus, the object of the present invention is to improve a clamping device of the design described in the introduction such that a possibly positive locking of the tubular housing of the steering column with the holders rigidly connected to the vehicle body will automatically take place when the clamping force applied by the clamping device is possibly exceeded.

According to the invention, a clamping device for an adjustable steering column in motor vehicles is provided in which a tubular housing can be clamped between two holders, rigidly connected to the vehicle body, by a clamping mechanism. The clamping mechanism includes a clamping bolt which passes through the two holders at right angles to the longitudinal axis of the tubular housing and can be actuated by a handle. The tubular housing is adjustable in the direction of its longitudinal axis. A locking member is provided which is supported by an abutment fixed axially at the clamping bolt. The locking member has a sword edge directed obliquely downward toward a component which is rigidly connected to the tubular housing, forming an angle with the longitudinal axis of the clamping bolt.

The oblique position of the locking member requires a locking member length between the sword edge and the support that is greater than the distance between the support and the component rigidly connected to the tubular housing, so that the sword edge is increasingly pressed against the component, thereby increasing the clamping force, in the case of a displacement of the component while the friction brought about by the maximum clamping force is overcome. The sword edge can finally dig into the surface of the component rigidly connected to the tubular housing and thereby bring about a positive-locking limitation of the path of displacement of the tubular housing in relation to the holders rigidly connected to the vehicle body.

In a preferred embodiment, the locking member is arranged movably in a holder mounted displaceably against spring action at the clamping bolt and can be pivoted against the component rigidly connected to the tubular housing by the axial clamping movement of the clamping bolt with the sword edge. This leads to a design in which the locking member is also moved by the clamping movement of the clamping bolt, so that the locking member is disengaged during the release of the clamped connection and is brought into the function during clamping. The clamping member is supported for this purpose with a round support surface in a complementary shell at the abutment, which is rigidly connected to the clamping bolt. The locking member is held preferably detachably at the clamping bolt and is loaded by a coil spring in the direction of action, and this linking of the locking member to the clamping bolt is designed as a predetermined breaking point, so that the detachable linking of the locking member to the holding element breaks on the clamping bolt as soon as the clamped connection between the holders rigidly connected to the vehicle body and the tubular housing slips through.

The features of the present invention lead to means comprising only a few, robust individual components for securing the connection between the holders rigidly connected to the vehicle body and the tubular housing of the steering column, which functions reliably even in those cases in which the air bag comes into action.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
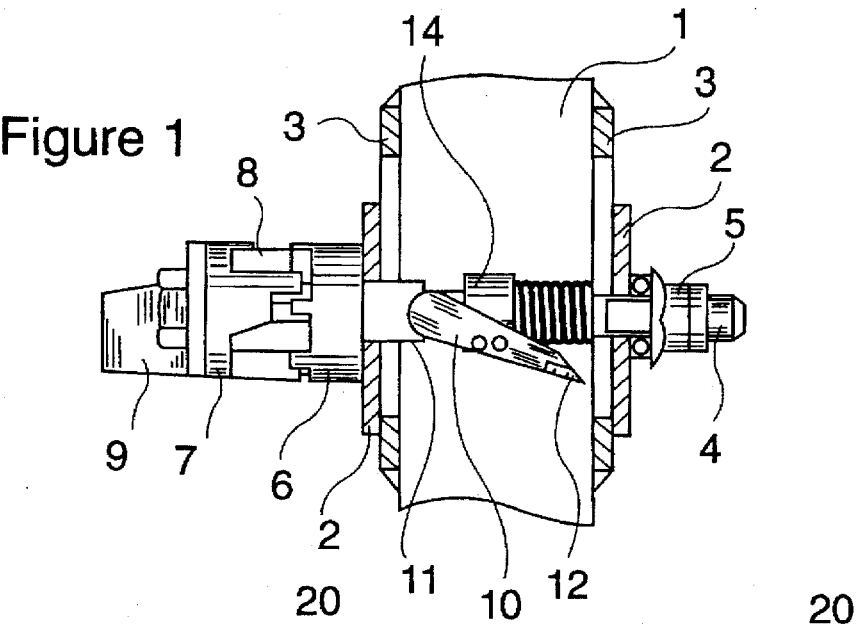
FIG. 1 is a sectional view of the released clamping means in a sectional plane passing through the longitudinal axis of the tubular housing.
Figure 2:
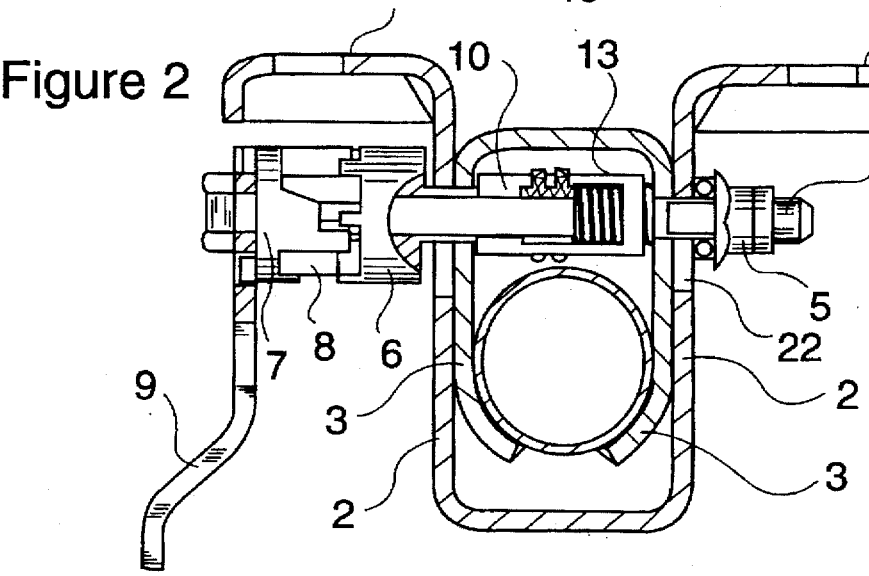
FIG. 2 is a cross sectional view at right angles to the sectional plane in FIG. 1.

For the adjustable fixation of the tubular housing 1 of a steering column of adjustable slope, two mutually parallel holders 2 of U-shaped cross section are connected to one another in the exemplary embodiment. The holders 2 can be fastened with bent flanges 20 to the body of a motor vehicle. A clamping flange 3 of likewise U-shaped cross section is provided on the tubular housing 1. The clamping flange 3 has on its outside friction surfaces cooperating with opposite friction surfaces on the holders 2 on both sides of the tubular housing 1. To apply sufficient clamping forces, a clamping bolt 4 passes through both the two lateral holders 2 and the clamping flanges 3 rigidly connected to the tubular housing 1. The adjusting movement is achieved by slots 22 of holders 2 and slots 24 of clamping flange 3 which are provided in a mutually crossing pattern. With a threaded nut 5, the clamping bolt 4 is supported at one end on the outside on one of the two holders 2, so that a possibility of adjustment is provided for the clamping force by rotating the threaded nut 5. A clamping mechanism is provided at the opposite end of the clamping bolt 4. In the example shown, the clamping mechanisms comprise two tilting pins 8, which are supported by a fixed abutment 6, on the one hand, and by an abutment 7 at the clamping bolt 4, on the other hand. Axial clamping forces are applied to the clamping bolt by pivoting the abutment 7 by means of a handle 9 in the known manner in order to establish a frictionally engaged connection between the holders 2 and the clamping flanges 3 at the tubular housing 1.

Figure 3:
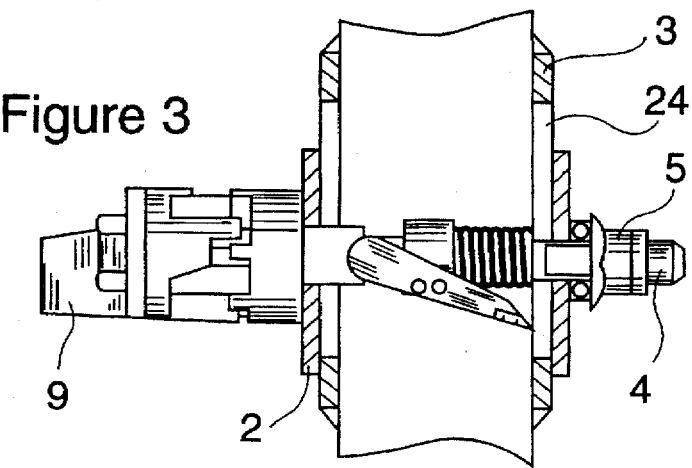
FIG. 3 is a sectional view corresponding to FIG. 1 through the tensioned clamping means.

A locking element 10 is additionally provided, which is supported by an abutment 11 which is fixed at the clamping bolt 4 at least axially, on the one hand, and is directed, on the other hand, obliquely downward toward the clamping flange 3 rigidly connected to the tubular housing 1 with the sword edge 12, forming an angle with the longitudinal axis of the clamping bolt 4. The locking member 10 is arranged movably in a holding element mounted displaceably at the clamping bolt against spring action by axial clamping movement of the clamping bolt and is pivotable against the clamping flange 3 with the sword edge 12. To achieve this, a coil spring 13 is supported, on the one hand, by the holding element 14 which is axially displaceable on the clamping bolt 4 and, on the other hand, by the clamping flange 3 or also by a shoulder on the clamping bolt 4. When the clamping mechanism is released, the spring 13 displaces the holding element 14 axially on the clamping bolt 4 and thereby pushes the locking element 10 connected to it, so that the sword edge 12 is not in contact with the clamping flange 3. A movement of the clamping bolt 4 in the opposite direction during the tensioning of the clamping mechanism brings about a displacement of the locking member 10 in the opposite direction, so that the sword edge 12 again comes into contact with the clamping flange 3 or possibly also with another component rigidly connected to the tubular housing 1. The rigid connection between the locking element 10 and the holding element 14 is preferably designed as a predetermined breaking point, so that this connection either falls apart or breaks when the sword edge 12 of the locking member is carried during the slipping of the frictional connection between the clamping flanges 3 and the locking element 10 and is pivoted around the mounting at the abutment 11 as a result. FIG. 1 shows the position of the locking member with the clamped connection released, while FIG. 3 shows the position of the locking element 10 with the clamped connection tensioned.

The length of the locking element 10, between the sword edge 12 and the abutment support 11 is greater than a distance between the support 11 and a clamping flange 3, the component 3 being rigidly connected to the tubular housing 1. With this arrangement, the sword edge is increasingly pressed against the component 3, thereby increasing the clamp force, in the case of a displacement of the component 3 upon the friction being overcome between the clamping flanges 3 and the holders 2. The sword edge 12 can dig into the surface of the component 3, which is rigidly connected to the tubular housing, and thereby bring about a positive-locking limitation of the path of displacement of the tubular housing 1 in relation to the holders 2 which are rigidly connected to the motor vehicle body via flanges 20.

While a specific embodiment of the invention has been shown and described in detail to illustrate the application of the principles of the invention, it will be understood that the invention may be embodied otherwise without departing from such principles.

What is claimed is:

1. A clamping device for an adjustable steering column in motor vehicles having a vehicle body, the clamping device comprising:

a tubular housing which is adjustable in a direction of a longitudinal axis;

a component rigidly connected to said tubular housing;

two holders rigidly connectable to the vehicle body;

a clamping mechanism for clamping said tubular housing between said two holders and for releasing the clamping for relative movement between said clamping mechanism and said tubular housing, said clamping mechanism including a clamping bolt which passes through said two holders substantially at a right angle with respect to said longitudinal axis of said tubular housing, said clamping mechanism including a handle for actuating the clamping mechanism;

an abutment fixed axially at said clamping bolt; and a locking member supported by said abutment for movement with said clamping bolt relative to said tubular housing, said locking member including a sword edge directed obliquely downward toward said component to form an angle with a longitudinal axis of said clamping bolt, said sword edge for automatically positively locking said tubular housing rigidly to said two holders upon slippage of said clamping mechanism.

2. A clamping device according to claim 1, further comprising a holding element and a spring connected to said clamping bolt, said holding element being mounted displaceably against spring action of said spring, said locking member being arranged movably in said holding element and being pivotable with said sword edge toward said component by an axial clamping movement of said clamping bolt.

3. A clamping device according to claim 1, wherein said abutment includes a support shell, said locking member having a round support surface disposed in contact with a complimentary portion of said support shell.

4. A clamping device according to claim 2, wherein said abutment includes a support shell, said locking member having a round support surface disposed in contact with a complimentary portion of said support shell.

5. A clamping device according to claim 1, further comprising a spring disposed on said clamping bolt, said locking member being held detachably at said clamping bolt and being loaded by said spring in a direction of action of said spring.

6. A clamping device according to claim 5, further comprising a connection holding said locking member detachably at said clamping bolt, said connection being designed as a predetermined breaking point.

7. A clamping device for an adjustable steering column in motor vehicles having a vehicle body, the clamping device comprising:

a tubular housing which is adjustable in a direction of a longitudinal axis;

a component rigidly connected to said tubular housing;

two holders rigidly connectable to the vehicle body;

a clamping mechanism for clamping said tubular housing between said two holders, said clamping mechanism including a clamping bolt which passes through said two holders substantially at a right angle with respect to said longitudinal axis of said tubular housing, said clamping mechanism including a handle for actuating the clamping mechanism;

an abutment fixed axially at said clamping bolt;

a locking member supported by said abutment, said locking member including a sword edge directed obliquely downward toward said component to form an angle with a longitudinal axis of said clamping bolt; and a holding element and a spring connected to said clamping bolt, said holding element being mounted displaceably against spring action of said spring, said locking member being arranged movably in said holding element and being pivotable with said sword edge toward said component by an axial clamping movement of said clamping bolt.

8. A clamping device for an adjustable steering column in motor vehicles having a vehicle body, the clamping device comprising:

a tubular housing;

a component rigidly connected to said tubular housing;

two holders rigidly connectable to the vehicle body;

clamping means for clamping said tubular housing between said two holders by frictional engagement between said two holders and one of said tubular housing and said component and for releasing the clamping for relative movement between said clamping means and said tubular housing, said clamping means including a clamping bolt which passes through said two holders substantially at a right angle with respect to a longitudinal axis of said tubular housing, said clamping means including a handle for actuating said clamping means for setting a position of said clamping means and said tubular housing in a direction of said longitudinal axis by said frictional engagement and for adjusting the position in said direction of said longitudinal axis between said clamping means and said tubular housing by release of said frictional engagement;

an abutment fixed to said clamping bolt;

locking means for locking said tubular housing with respect to said two holders to fixedly connect said tubular housing to said two holders, said locking means being supported by said abutment for movement with said clamping bolt relative to said tubular housing during release of said frictional engagement, said locking means including a sword edge directed obliquely downward toward said component to form an angle with a longitudinal axis of said clamping bolt, said sword edge for automatically positively locking said tubular housing rigidly to said two holders upon slippage of said frictional engagement of said clamping means.

9. A clamping device according to claim 8, further comprising a holding element and a spring connected to said clamping bolt, said holding element being mounted displaceably against spring action of said spring, said locking means being arranged movably in said holding element and being pivotable with said sword edge toward said component by an axial clamping movement of said clamping bolt.

10. A clamping device according to claim 9, wherein said abutment includes a support shell, said locking means having a round support surface disposed in contact with a complimentary portion of said support shell.

11. A clamping device according to claim 8, wherein said abutment includes a support shell, said locking means having a round support surface disposed in contact with a complimentary portion of said support shell.

12. A clamping device according to claim 8, further comprising a spring disposed on said clamping bolt, said locking means being held detachably at said clamping bolt and being loaded by said spring in a direction of action of said spring.

13. A clamping device according to claim 12, further comprising a connection holding said locking means detachably at said clamping bolt, said connection being designed as a predetermined breaking point.

* * * * *